US008965291B2

(12) United States Patent
Beacham et al.

(10) Patent No.: US 8,965,291 B2
(45) Date of Patent: Feb. 24, 2015

(54) COMMUNICATION OF AVIONIC DATA

(75) Inventors: William H. Beacham, Enfield, CT (US); Paul Raymond Scheid, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 718 days.

(21) Appl. No.: 12/835,031

(22) Filed: Jul. 13, 2010

(65) Prior Publication Data

US 2012/0015606 A1 Jan. 19, 2012

(51) Int. Cl.
| H04B 15/00 | (2006.01) |
| H04B 7/185 | (2006.01) |
| H04L 12/54 | (2013.01) |
| H04W 72/02 | (2009.01) |
| H04W 72/00 | (2009.01) |
| H04W 76/02 | (2009.01) |

(52) U.S. Cl.
CPC ........ H04B 7/18506 (2013.01); H04L 12/5692 (2013.01); H04W 72/02 (2013.01); H04W 72/00 (2013.01); H04W 76/02 (2013.01)
USPC .............................. 455/62; 455/431; 370/465

(58) Field of Classification Search
CPC ........... H04B 17/0042; H04B 17/0077; H04B 17/0057; H04B 7/12; H04B 7/005; H04B 7/0626; H04B 7/0632; H04B 7/18506; H04W 72/02; H04W 48/20; H04W 72/1231; H04W 24/00; H04W 72/04; H04W 84/12; H04W 16/12; H04L 1/0026; H04L 1/20; H04L 5/006; H04L 69/24; H04L 47/14; H04L 47/25
USPC ........ 455/62, 39, 435.1, 423, 431, 12.1, 63.4, 455/73, 454, 450, 405–407; 370/310, 465, 370/238, 335
See application file for complete search history.

(56) References Cited

U.S. PATENT DOCUMENTS

| 4,989,230 A | 1/1991 | Gillig et al. |
| 5,189,734 A | 2/1993 | Bailey et al. |
| 5,203,012 A | 4/1993 | Patsiokas et al. |
| 5,260,988 A | 11/1993 | Schellinger et al. |
| 5,274,837 A | 12/1993 | Childress et al. |
| 5,287,541 A | 2/1994 | Davis et al. |
| 5,301,359 A | 4/1994 | Van den Heuvel et al. |

(Continued)

FOREIGN PATENT DOCUMENTS

| EP | 0890907 | 1/1999 |
| EP | 1096699 | 5/2001 |

(Continued)

OTHER PUBLICATIONS

Extended European Search Reported dated Oct. 10, 2011. EP App. No. 11171956.3-1249.

*Primary Examiner* — Golam Sorowar
(74) *Attorney, Agent, or Firm* — Carlson, Gaskey & Olds, P.C.

(57) ABSTRACT

An example avionic data communication method includes establishing a plurality of available channels using a channel controller. The channel controller also establishes a quality of service for each of the plurality of available channels. The channel controller then selects one of the available channels. The quality of service of the selected channel is not less than the quality of service of another channel within the plurality of available channels. The method then communicates a type of data using the selected channel.

16 Claims, 2 Drawing Sheets

(56) References Cited

U.S. PATENT DOCUMENTS

| | | |
|---|---|---|
| 5,331,635 A | 7/1994 | Ota |
| 5,347,272 A | 9/1994 | Ota |
| 5,408,684 A | 4/1995 | Yunoki et al. |
| 5,428,636 A | 6/1995 | Meier |
| 5,457,711 A | 10/1995 | Kellermann |
| 5,475,864 A | 12/1995 | Hamabe |
| 5,475,868 A | 12/1995 | Duque-Anton et al. |
| 5,491,690 A | 2/1996 | Alfonsi et al. |
| 5,506,888 A | 4/1996 | Hayes et al. |
| 5,513,379 A | 4/1996 | Benveniste et al. |
| 5,519,884 A | 5/1996 | Duque-Anton et al. |
| 5,526,404 A | 6/1996 | Wiedeman et al. |
| 5,530,701 A | 6/1996 | Stillman et al. |
| 5,544,222 A | 8/1996 | Robinson et al. |
| 5,551,066 A | 8/1996 | Stillman et al. |
| 5,561,836 A | 10/1996 | Sowles et al. |
| 5,566,173 A | 10/1996 | Steinbrecher |
| 5,594,718 A | 1/1997 | Weaver, Jr. et al. |
| 5,594,943 A | 1/1997 | Balachandran |
| 5,649,308 A | 7/1997 | Andrews |
| 5,826,188 A | 10/1998 | Tayloe et al. |
| 5,886,988 A | 3/1999 | Yun et al. |
| 6,047,165 A | 4/2000 | Wright et al. |
| 6,091,709 A | 7/2000 | Harrison et al. |
| 6,104,914 A | 8/2000 | Wright et al. |
| 6,108,307 A | 8/2000 | McConnell et al. |
| 6,108,523 A | 8/2000 | Wright et al. |
| 6,115,365 A | 9/2000 | Newberg et al. |
| 6,148,179 A | 11/2000 | Wright et al. |
| 6,154,636 A | 11/2000 | Wright et al. |
| 6,154,637 A | 11/2000 | Wright et al. |
| 6,160,998 A | 12/2000 | Wright et al. |
| 6,163,681 A | 12/2000 | Wright et al. |
| 6,167,238 A | 12/2000 | Wright |
| 6,167,239 A | 12/2000 | Wright et al. |
| 6,173,159 B1 | 1/2001 | Wright et al. |
| 6,181,990 B1 | 1/2001 | Grabowsky et al. |
| 6,201,797 B1 | 3/2001 | Leuca et al. |
| 6,205,471 B1 | 3/2001 | Gilchrist et al. |
| 6,249,913 B1 | 6/2001 | Galipeau et al. |
| 6,272,343 B1 | 8/2001 | Pon et al. |
| 6,308,044 B1 | 10/2001 | Wright et al. |
| 6,308,045 B1 | 10/2001 | Wright et al. |
| 6,353,779 B1 | 3/2002 | Simon et al. |
| 6,408,180 B1 | 6/2002 | McKenna et al. |
| 6,438,468 B1 | 8/2002 | Muxlow et al. |
| 6,477,152 B1 | 11/2002 | Hiett |
| 6,499,027 B1 | 12/2002 | Weinberger |
| 6,501,733 B1 | 12/2002 | Falco et al. |
| 6,516,192 B1 | 2/2003 | Spaur et al. |
| 6,522,867 B1 | 2/2003 | Wright et al. |
| 6,636,789 B2 | 10/2003 | Bird et al. |
| 6,745,010 B2 | 6/2004 | Wright et al. |
| 6,757,712 B1 | 6/2004 | Bastian et al. |
| 6,760,757 B1 | 7/2004 | Lundberg et al. |
| 6,775,545 B2 | 8/2004 | Wright et al. |
| 6,795,408 B1 | 9/2004 | Hiett |
| 6,816,458 B1 | 11/2004 | Kroon |
| 6,816,728 B2 | 11/2004 | Igloi et al. |
| 6,847,801 B2 | 1/2005 | de La Chapelle et al. |
| 6,882,843 B1 | 4/2005 | Comer |
| 6,894,611 B2 | 5/2005 | Butz et al. |
| 6,943,699 B2 | 9/2005 | Ziarno |
| 6,990,319 B2 | 1/2006 | Wright et al. |
| 7,035,634 B2 | 4/2006 | Mead et al. |
| 7,065,367 B2 | 6/2006 | Michaelis et al. |
| 7,120,389 B2 | 10/2006 | de La Chapelle et al. |
| 7,370,283 B2 | 5/2008 | Othmer |
| RE40,479 E | 9/2008 | Wright et al. |
| 7,426,387 B2 | 9/2008 | Wright et al. |
| 7,426,388 B1 | 9/2008 | Wright et al. |
| 7,428,412 B2 | 9/2008 | Wright et al. |
| 7,444,146 B1 | 10/2008 | Wright et al. |
| 7,519,014 B2 * | 4/2009 | Allen et al. ............... 370/310 |
| 7,613,154 B2 | 11/2009 | Caspi et al. |
| 7,616,960 B2 | 11/2009 | Anke et al. |
| 2002/0018008 A1 | 2/2002 | Wright et al. |
| 2002/0137521 A1 | 9/2002 | Kim et al. |
| 2002/0155823 A1 * | 10/2002 | Preston et al. ............... 455/406 |
| 2003/0043811 A1 | 3/2003 | Leuca et al. |
| 2003/0210680 A1 | 11/2003 | Rao et al. |
| 2004/0092278 A1 | 5/2004 | Diepstraten et al. |
| 2004/0095901 A1 | 5/2004 | Rajkotia |
| 2004/0218605 A1 | 11/2004 | Gustafsson et al. |
| 2004/0264475 A1 | 12/2004 | Kowalski |
| 2005/0009525 A1 | 1/2005 | Evslin |
| 2005/0047425 A1 | 3/2005 | Liu et al. |
| 2005/0159160 A1 | 7/2005 | Chambers et al. |
| 2005/0181791 A1 * | 8/2005 | Mielke et al. ............... 455/435.1 |
| 2005/0275563 A1 | 12/2005 | Ziarno |
| 2006/0057974 A1 | 3/2006 | Ziarno et al. |
| 2006/0094417 A1 * | 5/2006 | Allen et al. ............... 455/423 |
| 2006/0276127 A1 * | 12/2006 | Cruz et al. ............... 455/12.1 |
| 2007/0026868 A1 * | 2/2007 | Schulz et al. ............... 455/454 |
| 2007/0130599 A1 * | 6/2007 | Monroe ............... 725/105 |
| 2007/0156296 A1 | 7/2007 | Wright et al. |
| 2007/0232230 A1 * | 10/2007 | Anke et al. ............... 455/39 |
| 2008/0205283 A1 | 8/2008 | McGuffin et al. |
| 2009/0041041 A1 | 2/2009 | True et al. |
| 2009/0201886 A1 * | 8/2009 | Lee et al. ............... 370/335 |
| 2009/0282469 A1 | 11/2009 | Lynch et al. |
| 2010/0232295 A1 * | 9/2010 | True et al. ............... 370/238 |
| 2010/0304739 A1 * | 12/2010 | Rooks et al. ............... 455/431 |

FOREIGN PATENT DOCUMENTS

| | | |
|---|---|---|
| EP | 2190144 | 5/2010 |
| FR | 2787658 | 6/2000 |
| FR | 2863133 | 6/2005 |
| GB | 2347586 | 9/2000 |
| JP | 2012551 | 1/1990 |
| WO | 0014987 | 3/2000 |
| WO | 2005040963 | 5/2005 |
| WO | 2006052171 | 5/2006 |
| WO | 2007013878 | 2/2007 |
| WO | 2009039148 | 3/2009 |

* cited by examiner

COMMUNICATION OF AVIONIC DATA

BACKGROUND

This disclosure relates generally to avionic data. More particularly, this disclosure relates to communicating avionic data based on the type of data and the quality of available communication channels.

As known, avionic data is typically collected from various areas of an aircraft. The avionic data is stored in data files on the aircraft. The data files are periodically communicated from the aircraft to a ground-based system. The aircraft also receives some data files from the ground-based systems to the aircraft. Some of the data files contain more critical data than other data files. As can be appreciated, communicating the data files containing the more critical data is more important than communicating other data files.

The data files may be wirelessly communicated through various communication channels, such as cellular channels, broadband Ethernet channels, WiFi channels, etc. The availability of channels for communicating the data files may change as the aircraft moves relative to the ground-based system. Often, some of the available communication channels are more expensive to use than other available communication channels.

Although a communication channel is available, that channel may be a experiencing a low quality of service. Atmospheric changes, mobile obstructions, availability of free channel bandwidth can all affect wireless quality of service, for example. For instance, when using a WiFi channel connected to a Gatelink service access point while the aircraft is parked at a gate, the system will have to share the available bandwidth of that access point with other transmitters. This could reduce the WiFi channel quality of service to a quality less than another competing communication channel of the same cost. As can be appreciated, the quality of a channel can change during a transmission. Transmitting data files using a channel with a low quality of service may result in a longer transmission time than if the data files were transmitted using a higher quality channel. If the selected channel is experiencing a low quality of service, multiple attempts may be required before a data file is successfully communicated.

SUMMARY

An example avionic data communication method includes establishing a plurality of available channels using a channel controller. The channel controller also establishes a quality of service for each of the plurality of available channels. The channel controller then selects one of the available channels. The quality of service of the selected channel is not less than the quality of service of another channel within the plurality of available channels. The method then communicates a type of data using the selected channel.

Another example avionic data communication method includes establishing a plurality of available channel types using a channel controller. The channel controller module selects one of the plurality of available channel types. The quality of service of the selected channel type is not less than the quality of service of another channel type within the plurality of available channel types. The method communicates selected data between an aircraft and a ground-based system using the selected channel type.

An example avionic data communication arrangement includes a switcher module that is configured to select a communication channel from a plurality of available communication channels. The selected communication channel has a quality of service that is not less than the quality of service of another communication channel within the plurality of available channels. A controller module is configured to select data for a transmission that has an associated cost of transmission that does not exceed a cost of transmission threshold for the established channel.

These and other features of the disclosed examples can be best understood from the following specification and drawings, the following of which is a brief description.

DETAILED DESCRIPTION

Figure 1:
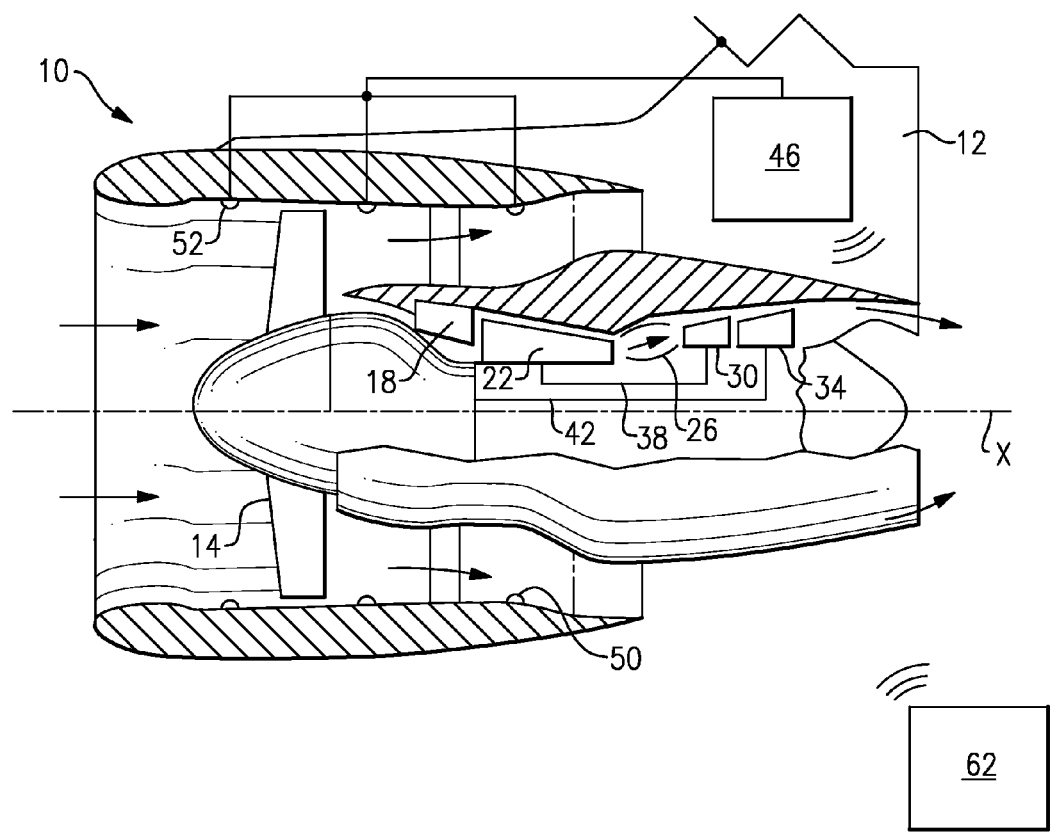
FIG. 1 shows a partial schematic view of an example data communication arrangement for an aircraft.

FIG. 1 schematically illustrates an example turbofan gas turbine engine 10 of an aircraft 12. The gas turbine engine 10 includes (in serial flow communication) a fan section 14, a low-pressure compressor 18, a high-pressure compressor 22, a combustor 26, a high-pressure turbine 30, and a low-pressure turbine 34. The gas turbine engine 10 is circumferentially disposed about an engine centerline X.

During operation, air is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26. The residual energy is then expanded through the nozzle section to produce thrust.

In a two-spool design, the high-pressure turbine 30 utilizes the extracted energy from the hot combustion gases to power the high-pressure compressor 22 through a high speed shaft 38, and the low-pressure turbine 34 utilizes the extracted energy from the hot combustion gases to power the low-pressure compressor 18 and the fan section 14 through a low speed shaft 42.

In this example, a data communication arrangement 46 is mounted to the aircraft 12. The data communication arrangement 46 is configured to communicate avionic data between the aircraft 12 and a ground-based system 62. Example avionic data includes data collected from sensors 52 mounted within the gas turbine engine 10. The sensors 52 collect avionic data about the engine 10 during operation, such as temperatures, pressures, altitudes, etc.

The examples described in this disclosure are not limited to any specific aircraft or aircraft engine architecture. Additional examples may include avionic data from other areas of the aircraft, such as the landing gear system, environmental control system, braking system, navigational system, entertainment system, etc.

Figure 2:
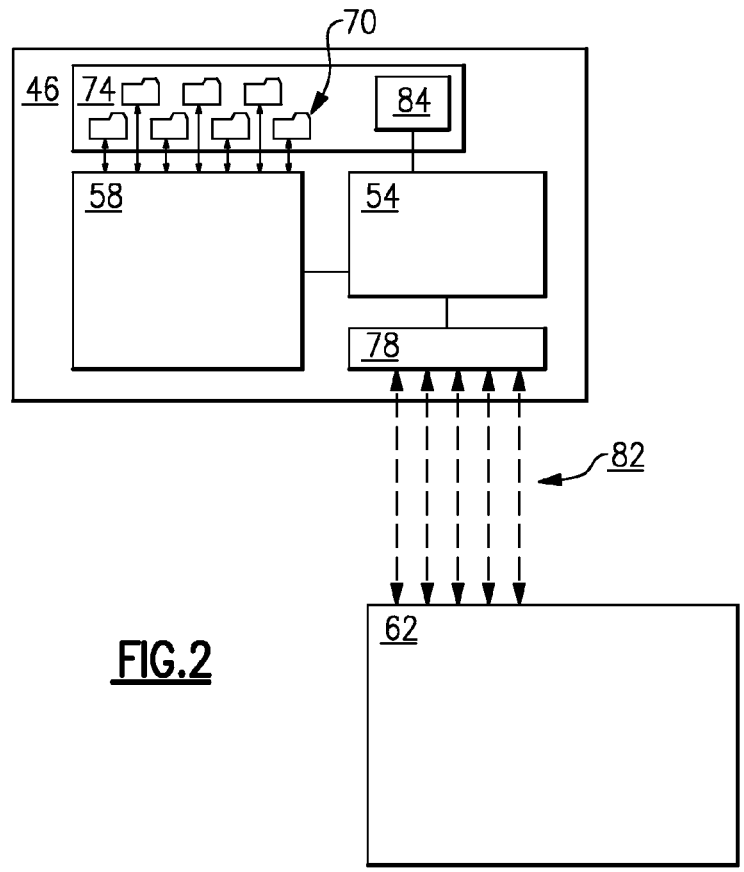
FIG. 2 shows a schematic view of the FIG. 1 arrangement.

Referring now to FIG. 2 with continuing reference to FIG. 1, the example avionic data communication arrangement 46 includes a channel controller 54 or switcher. The example avionic data communication arrangement also includes a data controller 58.

Avionic data is collected onboard the aircraft 12 and stored in data files 70 within a memory portion 74. A transmitter section 78 of the example arrangement 46 is configured to communicate the data files 70 to the ground-based system 62 using one of a plurality of communication channel types 82. The channel types 82 may include a cellular channel, a broadband Ethernet channel, a Wi-Fi channel, a WiMax channel, etc.

The example data communication arrangement 46 communicates selected ones of the data files 70 to the ground-based system 62 using one or more of the communication channel types 82. Off-load software within the data communication arrangement 46 is used to select communication channel types 82 for communicating the data files 70. Communication channel types 82 are selected based on the availability of the communication channel types 82, the present quality of service of the communication channel types 82, the cost of transmission, or some combination of these. The data communication arrangement 46 selects data files 70 for transmission based on the selected communication channel types 82.

The example data communication arrangement 46 is dynamic. For example, the data communication arrangement may periodically select a new one of the communication channel types 82 based on changes in the quality of service of the selected channel, even if a communication channel is in use.

The example data communication arrangement is also adaptive. For example, the data communication arrangement 46 may detect that certain ones of the communication channel types 82 are low service quality when the aircraft 12 is in certain positions relative to the ground-based system 62. The data communication arrangement 46 defaults to select another channel based on this information.

As can be appreciated, channel availability is dependent in part upon the location of the aircraft 12 relative to the ground-based system 62. That is, one or more of the communication channel types 66 may be unable to communicate the data files 70 due to the location of the aircraft 12 relative to the ground-based system 62. Other factors may influence the availability of channel types 66. In this example, the data files 70 communicate though one of the plurality of communication channel types 82 when the aircraft 12 is docked at a gate. In another example, the ground-based system 62 communicates with the aircraft 12 when the aircraft 12 is in flight, or when the aircraft 12 is docked in a maintenance facility, or when transitioning between locations while on the ground.

The transmitter section 78 includes many types of transmitters. For example, the transmitter section 78 includes a cellular transmitter used to transmit the data files 70 to the ground-based system 62 using a cellular type of communication channel. The transmitter section 78 further includes a WiFi transmitter used to transmit the data files 70 to the ground-based system 62 using a WiFi type of communication channel. Other types of transmitters as previously stated are housed in the transmitter section 78 depending on the channel types 82.

The example channel controller 54 continually monitors the availability of the channel types 82. If a channel type is available, that channel type is able to communicate data files 70 between the aircraft 12 and the ground-based system 62. At certain times, only one of the channel types 82 may be available. At other times, some or all of the channel types 82 may be available. A person having skill in this art and the benefit of this disclosure would understand how to monitor the availability of the channel types 82.

The example channel controller 54 also monitors the quality of service of the channel types 82. As can be appreciated, some of the channel types 82 may have a transmission quality that is different than others of the channel types 82. In another example, a controller (not shown) within the ground-based system 62 monitors the transmission quality of the channel types 82.

Various factors can influence the quality of service of the channel types 82, such as the atmosphere's effect on wireless signals, mobile obstructions, the time of day, and the availability of free channel bandwidth. The channel controller 54 is configured to monitor the transmission quality of the channel types 82 in addition to the availability of the channel type 82.

In one example of how the channel controller 54 monitors quality of service, the channel controller 54 and the ground-based system 62 communicate to determine the effective throughput for each of the channel types 82 that are available. The one of the channel types 82 having the highest effective throughput is considered to have the highest transmission quality or quality of service. That one of the channel types 82 is then used for communication of the data files 70. A channel having a low transmission quality may result in delayed transmissions or errors in transmissions. For example, bit errors during transmission may require multiple transmission attempts and therefore longer transmission times.

If there is no substantial difference between the transmission qualities of the channel types 82 that are available, the channel controller 54 may utilize more than one of the channel types 82 for communication.

If there is no substantial difference between the transmission qualities of the channel types 82 that are available, the channel controller 54 may select a channel for communication based on the costs associated with the transmission.

In one example, the channel controller 54 selects one of the channel types 82 having a higher cost of transmission because the transmission quality of that channel is higher quality than another one of the channel types 82 that is available.

The data controller 58 within the example arrangement 46 is configured to select the data files 70 for transmission. The data controller 58 may select some or all of the data files 70. Various factors influence the data controller 58 to select certain types of data files 70. The data controller 58 may base the selection of data files 70 on the types of data in the data files 70, the costs of transmission, the communication channel types 82 available for communication, the quality of service level of the channel types 66 available for communication, or some combination of these.

In one example, the data files 70 are stored within directories and classified as including critical data, intermediate data, non-critical data, events, or health files. Communicating the critical data is typically more important than communicating the health data, for example. The data controller 58 thus prioritizes transmitting the data files 70 that contain the critical data above the data files 70 that contain the health data. If only some of the channel types 82 are available for communication but costly, the data controller 58 initiates communication of only critical data from the data files 70. The health files, events, and non-critical data are held in the memory portion 74 until channel type 82 is available that is less expensive.

In this example, each of the channel types 82 has a cost-of-transmission threshold. A database 84 stored within the memory portion 74 stores the cost-of-transmission thresholds for each of the channel types. The data files 70 also have associated costs, which are stored in the database 84. After one of the channel types 82 is selected, only the data files 70 having associated costs at or below the cost-of-transmission threshold for the selected one of the channel types 82 are selected for transmission. The cost-of-transmission threshold for the channel types 82 may change depending on the position of the aircraft 12 relative to the ground-based system 62.

In the event that multiple channels are available for communication, the channel controller 54 may communicate data across the highest quality of service channel. In another example, the channel controller communicates data across a lower quality of service channel, but a channel that is less expensive to use than the other available channels within the channel types 66.

Many computing devices can be used to implement various functions described herein. For example, the channel controller 54, the data controller 58, the transmitter section 78, and the memory portion 74 may comprise portions of a dual architecture micro server card.

Further, in terms of hardware architecture, the arrangement 46 can additionally include one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as additional controllers, buffers (caches), drivers, repeaters, and receivers to enable communications. Further, the local interface may include address, control, and/or data connections to enable appropriate communications among the aforementioned components.

An example processor used within the channel controller 54, the data controller 58, or both, executes software code, particularly software code stored in the memory portion 74. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion 74 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion 74 may include one or more additional or separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Figure 3:
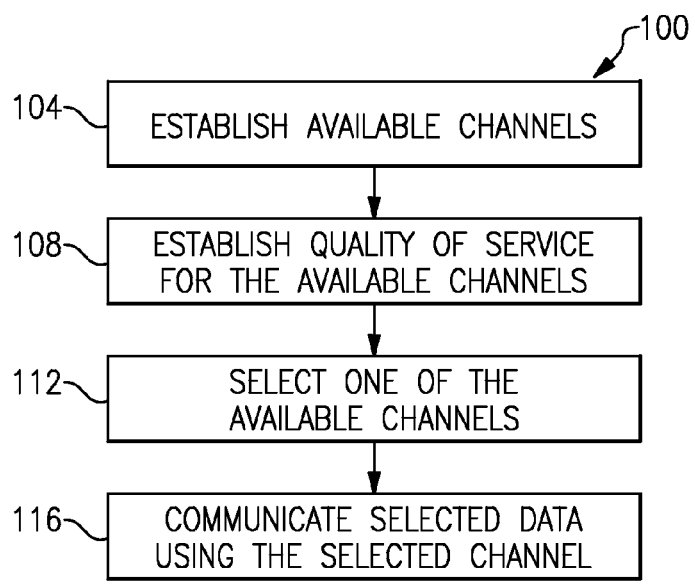
FIG. 3 shows the flow of an example avionic data communication method.

Referring to FIG. 3 with continuing reference to FIG. 2, an avionic data communication method 100 includes establishing a plurality of available channels using a channel controller 54 at a step 104. The method 100 establishes a quality of service for each of the plurality of available channels using the channel controller 54 at a step 108. At a step 112, the method selects one of the plurality of available channels using the channel controller 54. The transmission quality of the selected channel is taken into account in the ultimate selection of a channel. The method 100 then communicates a type of data using the selected channel at a step 116.

Features of the disclosed examples include communicating data between an aircraft and a ground-based system across a selected communication channel. The communication channel is selected based on based on the availability of the communication channel types 82, the quality of the communication channel types 82, the cost of transmission, or some combination of these. Data is selected for transmission based on the selected communication channel types 82.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An avionic data communication method comprising:
    establishing a plurality of available channels using a channel controller;
    establishing a quality of service for each of the plurality of available channels using the channel controller;
    selecting one of the plurality of available channels using the channel controller, the quality of service of the selected channel not less than the quality of service of another channel within the plurality of available channels;
    selecting a type of data based on the plurality of available channels, the type of data having an associated cost-of-transmission that does not exceed a cost-of-transmission threshold for the selected channel; and
    communicating the type of data using the selected channel, wherein the communicating comprises communicating the type of data between an aircraft and a ground-based system,
    wherein the cost-of-transmission threshold changes in response to changes in position of the aircraft relative to the ground-based system.

2. The avionic data communication method of claim 1, wherein the plurality of available channels includes a channel selected from a group that comprises a cellular channel, an Ethernet channel, a WiFi channel, and a WiMax or LTE channel.

3. The avionic data communication method of claim 1, wherein the channel controller is located within an aircraft.

4. The avionic data communication method of claim 1, wherein the type of data is selected from a group comprising a less critical data type and a more critical data type.

5. The avionic data communication method of claim 1, including prioritizing the communication of critical data above other types of data.

6. The avionic data communication method of claim 1, wherein the plurality of channels are at the same geographical location.

7. The avionic data communication method of claim 1, wherein the plurality of channels are different types of communication channels.

8. The avionic data communication method of claim 1, wherein the aircraft is stationary relative to the ground-based system during the communicating.

9. The avionic data communication method of claim 1, wherein the aircraft is docked relative to the ground-based system during the communicating.

10. An avionic data communication arrangement, comprising:

a channel controller configured to select a communication channel from a plurality of available communication channels, the selected communication channel having a quality of service that is not less than the quality of service of another communication channel within the plurality of available channels;

a data controller module configured to select data for transmission that has an associated cost-of-transmission that does not exceed a cost-of-transmission threshold for the established channel; and a transmitter configured to communicate the selected data using the selected communication channel, wherein the transmitter is configured to communicate the selected data between an aircraft and a ground-based system, wherein the cost-of-transmission threshold changes in response to changes in position of the aircraft relative to the ground-based system.

11. The avionic data communication arrangement of claim 10, wherein the established communication channel is selected from a group comprising that comprises a cellular channel, an Ethernet channel, a WiFi channel, and a WiMax or LTE channel.

12. The avionic data communication arrangement of claim 10, wherein a switcher module is configured to determine the plurality of available communication channels.

13. The avionic data communication arrangement of claim 10, wherein the channel controller is a separate controller from the data controller.

14. The avionic data communication arrangement of claim 10, wherein the plurality of available communications channels are at the same geographical location.

15. The avionic data communication arrangement of claim 10, wherein the plurality of available communications channels are different types of communication channels.

16. The avionic data communication arrangement of claim 10, wherein the transmitter is configured to communicate the selected data between an aircraft that is stationary relative to a ground-based system.

* * * * *